United States Patent
Sudau et al.

[11] Patent Number: 5,976,048
[45] Date of Patent: Nov. 2, 1999

[54] TORSIONAL VIBRATION DAMPER WITH A LUBRICANT FEED FOR A PLANET GEAR

[75] Inventors: Jörg Sudau; Erwin Wack, both of Niederwerrn, Germany

[73] Assignee: Fichtel & Sachs AG, Schweinfurt, Germany

[21] Appl. No.: 08/819,754

[22] Filed: Apr. 3, 1997

[30] Foreign Application Priority Data

Apr. 3, 1996 [DE] Germany .............. 196 13 325

[51] Int. Cl.⁶ .................................. F16F 15/134
[52] U.S. Cl. .................... 475/159; 475/346; 464/68
[58] Field of Search .................... 475/159, 160, 475/346, 347; 464/68

[56] References Cited

U.S. PATENT DOCUMENTS

| 5,102,379 | 4/1992 | Pagluica et al. ............... 475/159 X |
| 5,472,383 | 12/1995 | McKibbin ........................ 475/159 |
| 5,643,126 | 7/1997 | Hotta et al. .................... 475/159 |

FOREIGN PATENT DOCUMENTS

| 3929743 | 4/1990 | Germany .............. 475/159 |
| 4136040 | 1/1993 | Germany . |
| 8718068 | 7/1993 | Germany . |
| 9414314 | 1/1995 | Germany . |
| 63-158344 | 7/1988 | Japan ..................... 475/159 |
| 2272736 | 5/1994 | United Kingdom ......... 475/159 |
| 2 296 072 | 6/1996 | United Kingdom . |
| 2 300 690 | 11/1996 | United Kingdom . |

*Primary Examiner*—Khoi Q. Ta
*Attorney, Agent, or Firm*—Cohen, Pontani, Lieberman & Pavane

[57] ABSTRACT

A torsional vibration damper is provided with a transmission element on the driving side, at least one planet carrier which is provided with at least one bearing for receiving a planet gear engaging with at least one ring gear, and a transmission element on the driven side. One of the transmission elements has a controller for elastic elements of a damping arrangement. At least one lubricant feed is associated with the planet gear. The lubricant feed extends, at least along part of its extent, within the range of extension of the planet gear and opens out in the region of the bearing. Lubricant can flow through this lubricant feed due to the pumping action of the planet gear as it rotates relative to other elements of the planetary gear unit.

16 Claims, 5 Drawing Sheets

TORSIONAL VIBRATION DAMPER WITH A LUBRICANT FEED FOR A PLANET GEAR

BACKGROUND OF THE INVENTION

1. Field of the Invention

The invention is directed to a torsional vibration damper.

2. Description of the Prior Art

German reference DE-GM 94 14 314 discloses a torsional vibration damper having a transmission element on the driving side and a planet carrier which is in a working connection with the transmission element. The plant carrier is provided with a plurality of bearings, each of which receives a planet gear. The planet gears engage at one end with a ring gear and at the other end with a sun gear. Depending upon the construction of the torsional vibration damper, a transmission element on the driven side is associated with one of the elements of the planetary gear unit, i.e., the sun gear, ring gear or planet carrier. Either the driven-side transmission element or the driving-side transmission element has controlling means for an elastic arrangement in the form of springs which extend in the circumferential direction and are supported at the other end at one of the elements of the planetary gear unit mentioned above.

In such torsional vibration dampers having a planetary gear unit, it is conventional, when the planet gears are mounted on their respective bearing provided at the planet carriers, to lubricate the contact point between the bearing and the radial inner side of the respective planet gear or to apply lubricant to the bearing itself. During operation of the torsional vibration damper, an ever increasing proportion of this lubricant exits at the bearing or at the contact point between the bearing and planet gear, while the remaining lubricant undergoes an aging process. This causes increased wear at the aforementioned contact point, which in turn leads to disadvantageous behavior in the meshing area of the toothings owing to inexact guidance of the planet gears caused by this wear.

SUMMARY OF THE INVENTION

The object of the present invention is to further develop the generic torsional vibration damper such that the occurrence of wear at the bearing or at the contact point between the planet gears and their bearings remains minimal even over longer operating periods.

Pursuant to this object, and others which will become apparent hereafter, one aspect of the present invention resides in a torsional vibration damper having a drive-side transmission element, a driven-side transmission element rotatable relative to the drive-side transmission element, a damping arrangement including elastic elements, means for controlling the elastic elements, and a planetary gear unit. The planetary gear unit includes a toothed ring gear, at least one planet carrier having at least one bearing, and a toothed planet gear arranged on the bearing so as to engage with the ring gear. The planetary gear unit is arranged between the transmission elements. Lubricant feed means are associated with the planet gear and are configured to extend within the range of extension of the planet gear and open out in a region of the bearing to permit lubricant to flow due to a pumping action of the planet gear as the planet gear rotates relative to the planet carrier end of the ring gear.

In another embodiment of the invention the lubricant feed means includes at least one feed line configured to start in an engaging region of the toothing of the planet gear with the toothing of the ring gear, and end in a region of the bearing.

By assigning at least one lubricant feed to every planet gear, it is ensured that lubricant can always be fed to the region of the bearing or the contact point between the respective planet gear and its bearing. On the one hand, this provides for a sufficient quantity of lubricant at the contact point at all times and, on the other hand, ensures that used lubricant will be replaced by fresh lubricant. The lubricant feed can be provided with at least one feed line which guides the lubricant located within the range of extension of the respective planet gear to the contact point between the planet gear and its bearing or to the bearing itself. In torsional vibration dampers, for instance, this lubricant is usually arranged for damping purposes in a chamber which serves at the same time to house the planetary gear unit, or at least the radial outer portion thereof, namely, the ring gear and the toothing of the planet gear. This lubricant is in the form of a viscous grease which deposits in the radial outer region due to the relative deflection of the transmission elements of the torsional vibration damper during operation under the influence of centrifugal force. In so doing, as was already mentioned above, the lubricant can penetrate inward radially until reaching the meshing region of the toothings of the planet gears, e.g., with a ring gear. Due to the construction of the lubricant feed with at least one feed line, this lubricant can now be conveyed from the region where it is stored, that is, for example, between the toothings of the ring gear and planet gear, or from at least one of the end faces of the planet gear, to the contact point between the planet gear and its bearing or to the bearing itself. The feed line can lead radially inward from the toothing of the respective planet gear, where it ends either at the bearing, at the contact point between the planet gear and the bearing, or in a lubricant receptacle. The latter construction in particular is advantageous since the lubricant receptacle serves as a reservoir for lubricant and can constantly be supplied, via the feed line, with fresh lubricant which can be conveyed to the bearing or to the contact point between the planet gear and bearing. The feed line can run in the region between the two end faces of the planet gear so as to penetrate the latter, but can also be formed by depressions at the end faces of the planet gear. With respect to the penetration of the planet gear, an advantageous construction of the feed line includes a valve element which allows lubricant to pass through the feed line in a predetermined direction, but blocks it in the opposite direction. The valve element ensures that fresh lubricant can reach the lubricant receptacle via the feed line and pass from the lubricant receptacle to the bearing or contact point between the bearing and the planet gear. But a returning movement of the lubricant due to the influence of centrifugal force is prevented.

In addition to the advantages mentioned above, the construction of the lubricant feed with a lubricant receptacle also provides for a more uniform lubrication of the bearing or the contact point between the planet gear and bearing, since the reservoir ensures that there is never a lack of lubricant. The receptacle may take the form of depressions at the planet carrier, at the radial inner side of the planet gear, or at the radial outer side of the bearing. Alternatively, combinations of these arrangements can also be provided.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
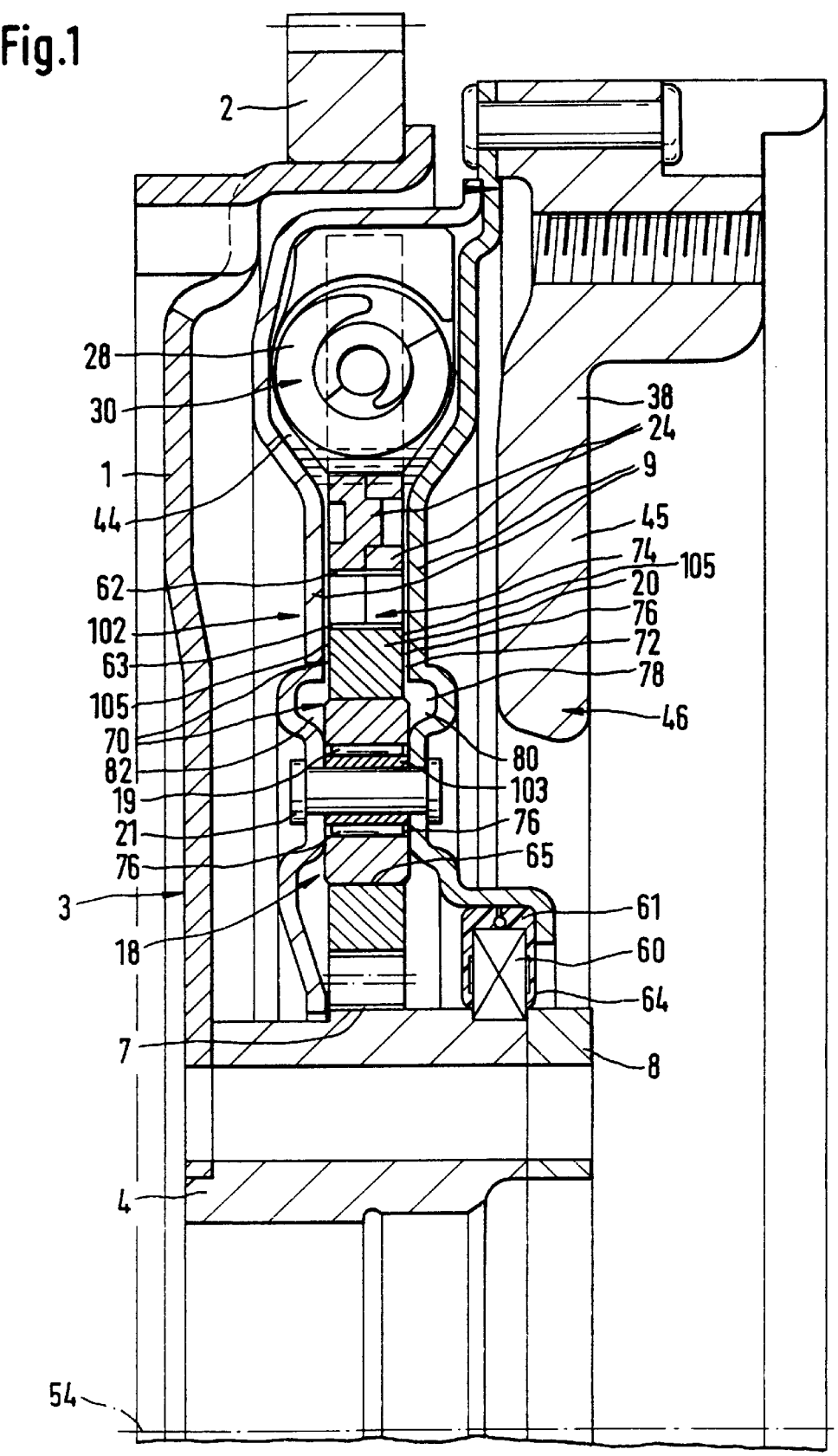
FIG. 1 is a sectional view showing a torsional vibration damper with a planetary gear unit with reverse coupling to a transmission element on the driving side.

FIG. 1 shows a torsional vibration damper which has, at its left side, a flywheel mass 1 which serves to introduce a driving movement and acts in the circumferential region with a ring gear 2 for a starter pinion, not shown. The flywheel mass 1 acts as a driving-side transmission element.

The flywheel mass 1 is fastened to a hub 4 which is mounted on a crankshaft of an internal combustion engine, not shown, by means of rivets, not shown, together with a sun gear 7 of a planetary gear unit 102 and a flange 8. The sun gear 7 is likewise arranged on the hub 4. The planetary gear unit 102 has two planet carriers 9 arranged on either side of the sun gear 7. The planet carrier on the left side extends radially inward until the hub 4, while the planet carrier 9 on the right side makes contact at its radial inner end with a heat shield 61 which has an L-shaped cross section and protects a bearing 60 from transmitted heat. The arm 64 of the heat shield 61 which reaches radially inward up to the inner bearing ring carries out a sealing function relative to a chamber 44 which is at least partially filled with lubricant. This chamber 44 will be described more fully hereinafter.

The two planet carriers 9 are provided with a plurality of bearings 18 arranged on the same diameter, e.g., needle bearings 19. A planet gear 20 is respectively mounted on each of the bearings 18 so as to be arranged between the two planet carriers 9. The planet carriers 9 are held at a fixed distance from one another in the axial direction by sleeves 103 and are pulled tightly against the two ends of the respective sleeve 103 by rivets 21 arranged in the sleeves 103.

The planet gears 20 engage with the sun gear 7 on one side and, on the other side, mesh with a ring gear 24 which is likewise arranged between the two planet carriers 9. This ring gear 24 has recesses, not shown, radially on the outside of its toothing engagement with the planet gears 20, these recesses being formed at predetermined angular distances from one another. An elastic element 28 of a damping arrangement 30 is inserted in each recess. One end of each elastic element 28 is supported at the ring gear 24 and the other end is supported at the planet carrier 9, specifically via controlling means, not shown.

The elastic elements 28 are located in the axial direction between the two planet carriers 9 which are fixedly connected in the radial outer region with one another and with a flywheel 38 of a second flywheel mass 45. The planet carriers 9 define the above-mentioned chamber 44 which is part of the flywheel mass 45. The chamber 44 receives the toothed wheels 7, 20 and 24 and the elastic elements 28, and is at least partially filled with viscous medium as lubricant so that the lubricant settles in the radial outer region of the chamber 44 during rotation of the flywheel masses 1, 45 under the influence of centrifugal force and thus forms a ring whose radial inner region preferably extends inward radially to the base of the toothing 63 of the planet gears 20. The toothed wheels 20, 24 are secured in the axial direction by means of the planet carriers 9. The second flywheel mass 45 serves as a driven-side transmission element 46 which is provided with means not shown in the drawing for receiving a frictional-locking or positive-locking coupling.

The operation of the torsional vibration damper will be described hereinafter. When a torque is introduced to a transmission element 3 on the input side, torsional vibrations being superposed on this torque when using an internal combustion engine as drive, the movement caused thereby is directed to the sun gear 7 which drives the planet gears 20 via a toothed engagement. While the torque is transmitted via the planet gears 20 to the planet carrier 9 and accordingly to the transmission element 46 on the output side without a change in the direction of rotation, the torsional vibration damper provides for a quantitative reduction in the torsional vibration introduced with the torque. In this connection, since the planet carrier 9 still acts at first such that it is fixed with respect to relative rotation due to its inertia, the movement of the sun gear 7 is converted into a rotation of the planet gears 20 about the respective bearing 18 and into a movement of the bearing 18 itself, and thus of the ring gear 24, about the rotational axis 54. The ring gear 24 is accordingly deflected out of the neutral position shown in FIG. 2, that is, at a maximum, to the end position shown in FIG. 3. As will be seen especially from FIG. 3, during this rolling movement of the ring gear 24 relative to the planet gears 20, lubricant is displaced between the toothing 62 of the ring gear 24 and the toothing 63 of the planet gears 20. A portion of this lubricant is pressed out in the axial direction of the toothed wheels 20, 24, while another portion is pressed into a lubricant feed 70 (e.g., FIG. 4) whose construction will be discussed more fully hereinafter and which serves to bring the lubricant into the range of extension of the bearing 18 via a feed line 72. The toothed wheels 20, 24 accordingly act as lubricant pumps 74.

Figure 2:
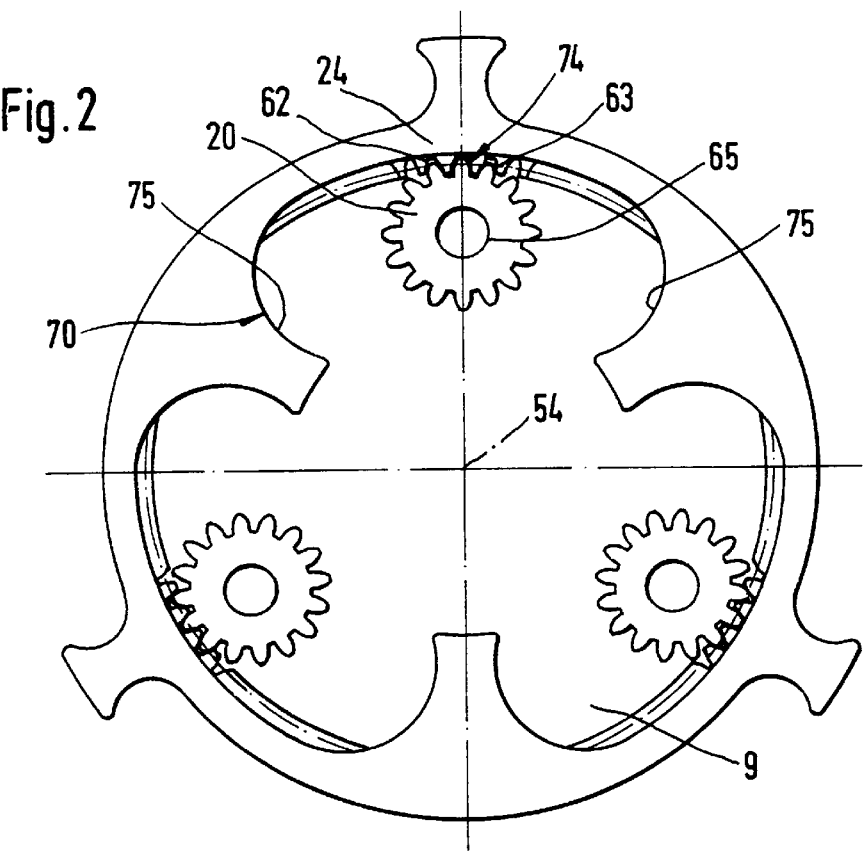
FIG. 2 shows a ring gear of the planetary gear unit with guiding elements for lubricant and with planet gears in the neutral position of the two transmission elements.
Figure 3:
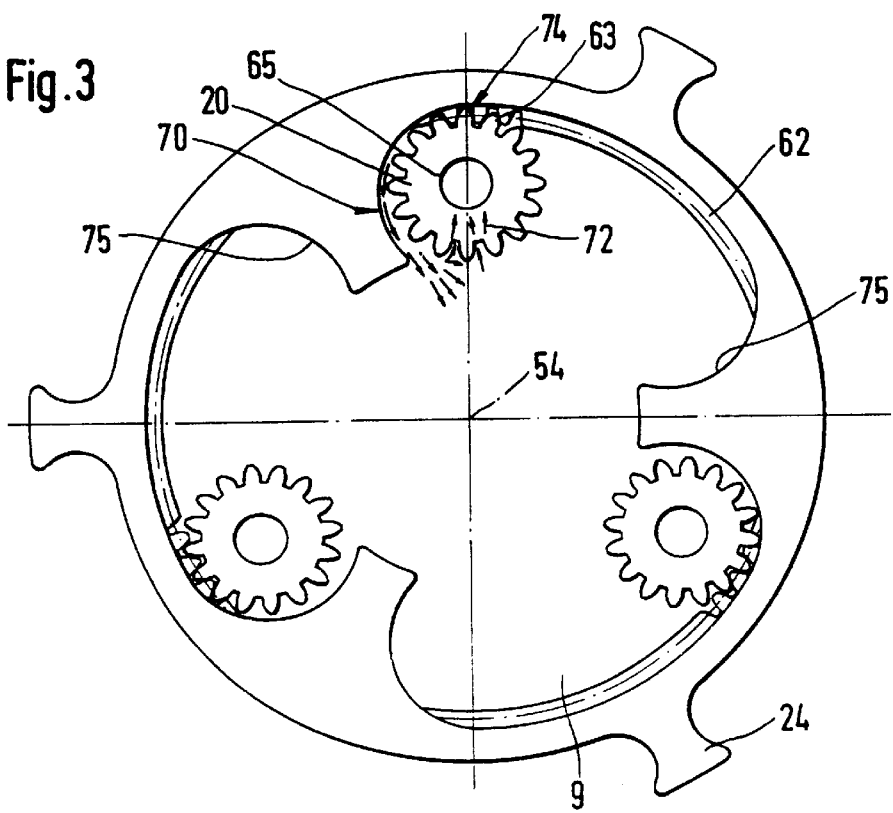
FIG. 3 is a view as in FIG. 2, but with maximum rotational deflection of the transmission elements relative to one another.

In the construction of the ring gear 24 according to FIGS. 2 and 3, the ring gear 24 is provided with guiding elements 75 which project radially inward. The distance between two such guiding elements 75 in the circumferential direction is dimensioned slightly in excess of the maximum deflection of the two transmission elements 3, 46. As will be seen from FIG. 3, as a result of a relative deflection of the two transmission elements 3, 46, one of the guiding elements 75 is moved closer to the planet gear 20 associated with this rotational direction, so that lubricant which is conveyed through the toothings 62, 63 due to the movement of the toothed wheels 20, 24 in the circumferential direction strikes the side of the guiding element 75 associated with the respective planet gear 20 and is deflected substantially radially inward at the latter with respect to the ring gear 24.

Figure 4:
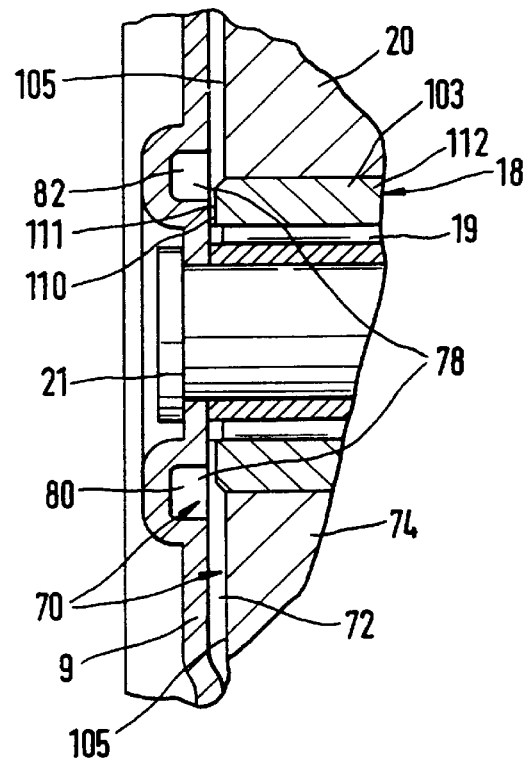
FIG. 4 shows a planet carrier of the planetary gear unit with a lubricant receptacle in the surrounding area of the bearing of a planet gear.

Proceeding from this region which is located relatively far inside radially, the lubricant flows radially outward, via a feed line 72 which is shown in FIG. 4 and located axially between at least one of the end faces 105 of the planet gear 20 and the planet carrier 9 associated with this end face 105, to the bearing 18 or to the contact point between the bearing 18 and the planet gear 20. The latter mentioned construction is particularly appropriate when the planet gear 20 is arranged on a sliding bearing. Within the region of extension of the bearing 18, the feed line 72 opens into a lubricant receptacle 78 which, together with the feed line 72, forms the lubricant feed 70 and encloses the bearing 18 as a depression 80 in the form of an annular groove 82 provided in the planet carrier 9. The lubricant receptacle 78 forms a reservoir for the lubricant which accumulates therein after being fed through the feed line 72 and arrives at the needle bearings 19 via a gap 110 axially between the planet carrier 9 and the associated end face 111 of an outer bearing ring 112 of the bearing 18.

Figure 5A:
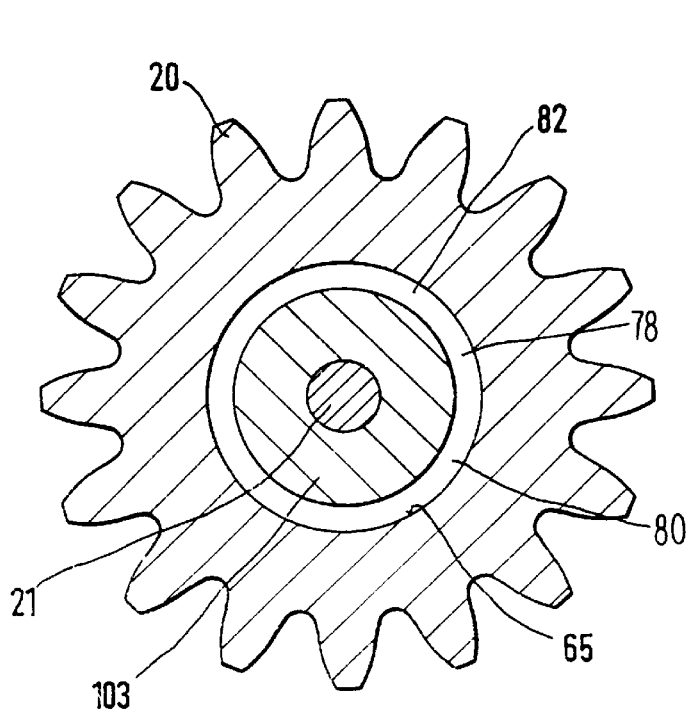
FIGS. 5 and 5A is a sectional view of a planet gear with a lubricant receptacle in the radial inner region.
Figure 5:
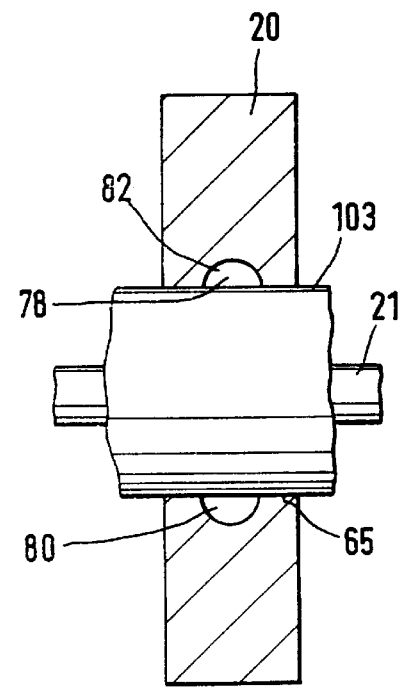

In contrast to the lubricant receptacle 78 mentioned above, the lubricant receptacle 78 according to FIGS. 5 and 5A is provided at the radial inner side of the planet gear 20 as an annular groove 82. This location for the lubricant receptacle 78 is especially advantageous when the sleeve 103 of the bearing 18 is fixedly connected with the rivet 21, wherein the respective planet gear 20 is arranged on the sleeve 103 by means of a sliding support. Lubrication of the contact point 65 between the bearing 18 and the planet gear 20 is improved by means of the lubricant received in the annular groove 82. In this construction, the filling of the lubricant receptacle 78 is advantageously effected in a manner to be described hereinafter.

Figure 6:
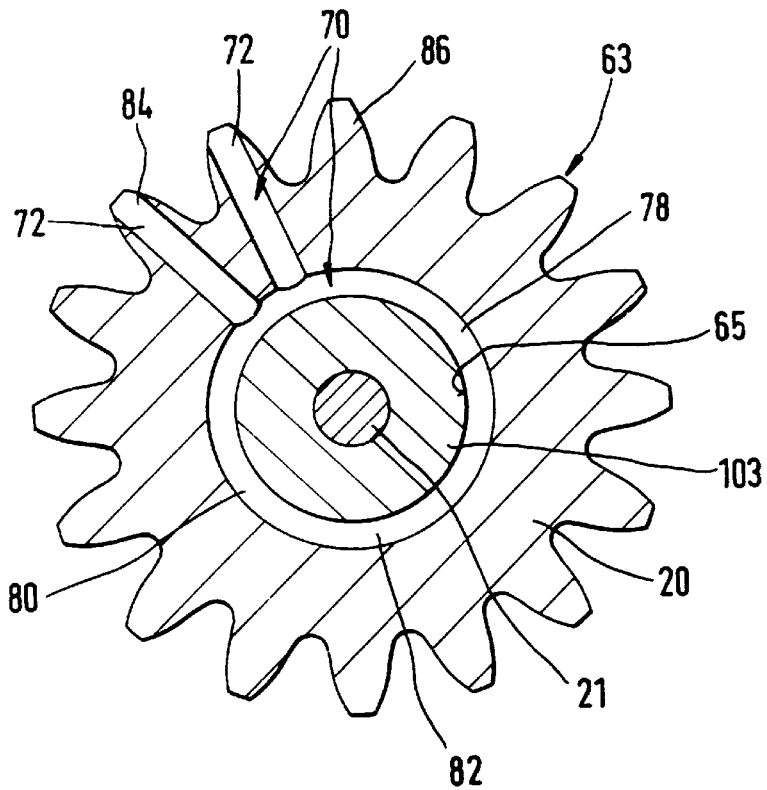
FIG. 6 is a view as in FIG. 5, but, in addition, with a lubricant feed having a feed line which begins radially outside at the free end of the teeth of the toothing centrally between two end faces in each instance.
Figure 7:
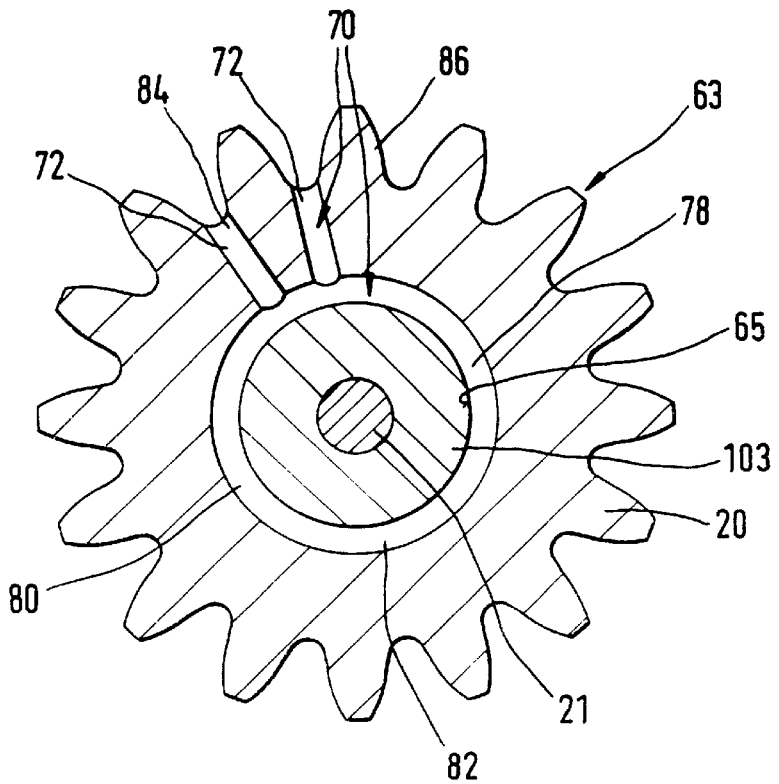
FIG. 7 is a view as in FIG. 6, but with the feed line beginning radially outside between two teeth of the toothing.

FIG. 6 shows a construction of the planet gear 20 in which the lubricant receptacle 78, in the form of an annular groove 82, is connected with the radial outer region of the planet gear 20 via at least one duct 84 which acts as a feed line 72 of the lubricant feed 70. In the construction according to FIG. 6, for example, there are two ducts 84. However, it is also possible for each tooth 86 of the toothing 63 of the planet gear 20 to be formed with such a duct 84. The ducts 84 run centrally between the two end faces of the planet gear 20, that is, starting from the radial outside at the free end of a tooth 86 and running toward the radial inside where they open into the annular groove 82. As the toothing 63 of the planet gear 20 rolls along the toothing 62 of the ring gear 24, a portion of the lubricant which is displaced between the toothings is pressed into the associated duct 84 and in this way travels radially inward to reach the contact point 65 between the radial inner side of the planet gear 20 and the bearing 18 where lubrication is effected. FIG. 7 shows yet another construction in which the ducts 84 are formed in the center between the end faces of the respective planet gear 20 between every two teeth 86 of the toothing 63. Otherwise, the planet gear according to FIG. 7 corresponds to that shown in FIG. 6 with respect to design and operation.

Figure 8:
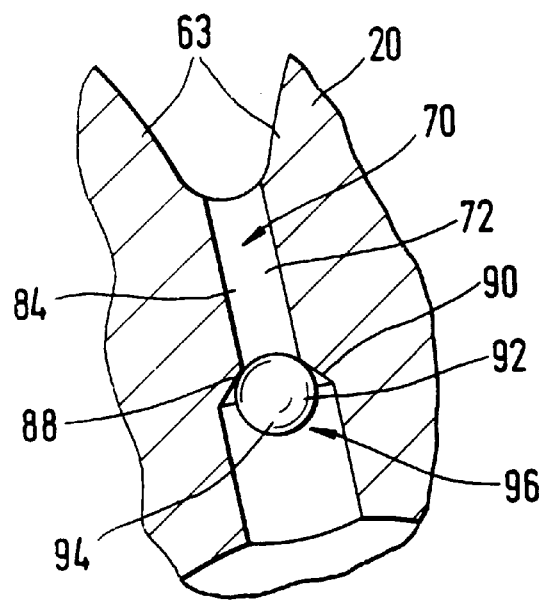
FIG. 8 is a view as in FIG. 6, but with a feed line containing a valve element.
Figure 9:
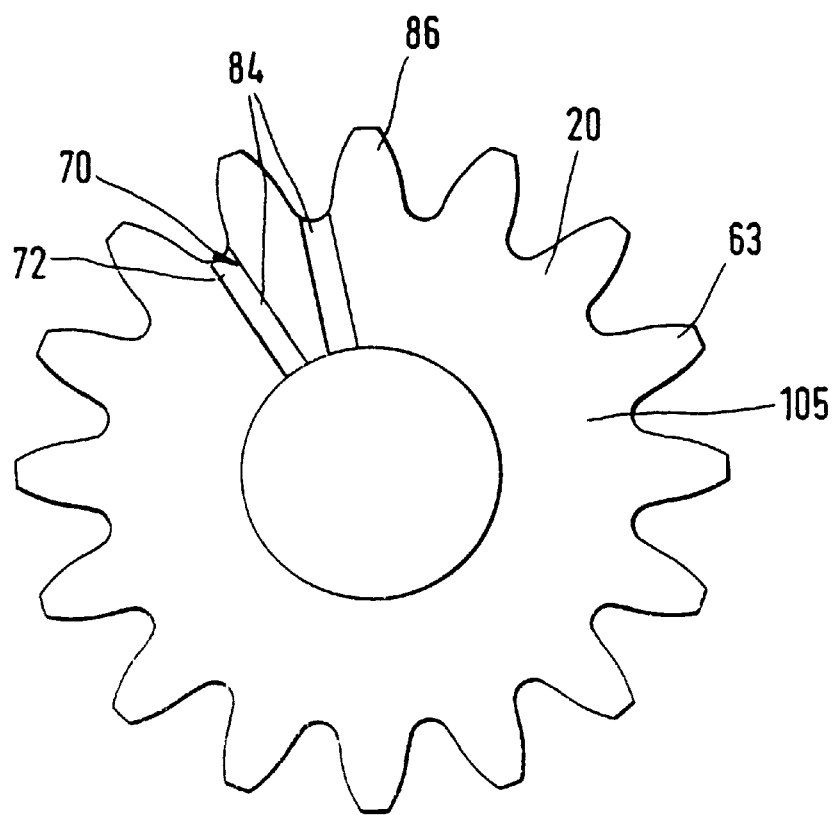
FIG. 9 is a view as in FIG. 6, but with feed lines on at least one end face of the planet gear.

FIG. 8 shows an advantageous construction of the duct 84 which is guided radially inward in that the duct 84 is constructed with two different diameters in the radial direction. The cross-sectional transition 88 between the two diametral regions is conical and serves as a seat 90 for closing means 94 formed by a ball 92. In this case, a valve element 96 is associated with the duct 84. The valve element 96 acts in such a way that lubricant which is displaced between the toothings 62, 63 as the planet gears 20 roll relative to the ring gear 24 can be pressed radially into the duct 84, and is prevented from flowing back as a result of centrifugal force such that the ball 92 presses against its conical seat 90 and accordingly closes the valve element 96 as soon as this centrifugal force is present. Having once penetrated, lubricant is thenceforth available at the contact point 65 between the planet gear 20 and bearing 18. Although this is not shown in FIG. 8, this duct 84 can also preferably be combined with an annular groove 82 which is formed at the radial inner side of the planet gear 20 and acts as the lubricant receptacle 78. This also applies to the construction according to FIG. 9 in which ducts 84 are constructed on at least one of the two end faces 105 of the planet gear 20. Due to the fact that the planet carrier 9 associated with the respective end face is brought up to within a gap width, the planet carrier 9 acts as a closure for the ducts 84 so that lubricant which is displaced in the axial direction between the toothings 62, 63 as the ring gear 24 and planet gears 20 roll against one another can reach the ducts 84 and is pressed radially inward.

In all of the variants in which a planet gear 20 is arranged on the sleeve 103 of the bearing 18 in a sliding support, the annular groove 82 mentioned above which is constructed as a lubricant receptacle 78 at the radial inner side of the planet gear 63 can also be provided at the radial outer side of the sleeve 103. It is essential only that the respective feed line 72 of the lubricant feed 70 be connected with the associated lubricant receptacle 78.

The invention is not limited by the embodiments described above which are presented as examples only but can be modified in various ways within the scope of protection defined by the appended patent claims.

We claim:

1. A torsional vibration damper, comprising:
   a drive-side transmission element; a driven-side transmission element rotatable relative to the drive-side transmission element; a damping arrangement including elastic elements; means for controlling the elastic elements; a planetary gear unit including a toothed ring gear, at least one planet carrier having at least one bearing, and a toothed planet gear arranged on the bearing so as to engage with the ring gear, the planetary gear unit being arranged between the transmission elements; and lubricant feed means associated with the planet gear, the lubricant feed means being configured to extend to the planet gear and open out in a region of the bearing for permitting lubricant to flow due to a pumping action of the planet gear as the planet gear rotates relative to the planet carrier and the ring gear of the planetary gear unit, the lubricant feed means including at least one feed line configured to start in an engagement region of the toothing of the planet gear with the toothing of the ring gear, and end in a region of the bearing.

2. A torsional vibration damper, comprising:
   a drive-side transmission element; a driven-side transmission element rotatable relative to the drive-side transmission element; a damping arrangement including elastic elements; means for controlling the elastic elements; a planetary gear unit including a toothed ring gear, at least one planet carrier having at least one bearing, and a toothed planet gear arranged on the bearing so as to engage with the ring gear, the planetary gear unit being arranged between the transmission elements; and lubricant feed means associated with the planet gear, the lubricant feed means being configured to extend to the planet gear and open out in a region of the bearing for permitting lubricant to flow due to a pumping action of the planet gear as the planet gear rotates relative to the planet carrier and the ring gear of the planetary gear unit, the ring gear being formed with at least two guiding elements configured to deflect lubricant radially inward and be circumferentially spaced from one another, the guiding elements being arranged at a distance to a neutral position of the planet gear, as seen in a circumferential direction, in which there is no relative deflection of the transmission elements, the distance being defined by at least maximum oppositely directed deflection paths of the transmission elements proceeding from a neutral position.

3. A torsional vibration damper, comprising:

a driveside transmission element; a driven-side transmission element rotatable relative to the drive-side transmission element; a damping arrangement including elastic elements; means for controlling the elastic elements; a planetary gear unit including a toothed ring gear, at least one planet carrier having at least one bearing, and a toothed planet gear arranged on the bearing so as to engage with the ring gear, the planetary gear unit being arranged between the transmission elements; and lubricant feed means associated with the planet gear, the lubricant feed means being configured to extend to the planet gear and open out in a region of the bearing for permitting lubricant to flow due to a pumping action of the planet gear as the planet gear rotates relative to the planet carrier and the ring gear of the planetary gear unit, the lubricant feed means including a lubricant receptacle in the region of the bearing, the lubricant receptacle being configured as a depression formed in the planet carrier of the planetary gear unit, at a side facing a contact point between each two of the planet gear, the bearing and the planet carrier, the depression being configured to enclose the rotational axis of the planet gear.

4. A torsional vibration damper according to claim 1, wherein the feed line is provided between an end face of the planet gear and an end face of the axially adjacent planet carrier.

5. A torsional vibration damper according to claim 1, wherein the feed line is configured as a duct that extends from a free end of a tooth of the planet gear.

6. A torsional vibration damper according to claim 1, wherein the feedline is configured as a duct arranged in a circumferential area between two teeth of the planet gear.

7. A torsional vibration damper according to claim 5, wherein the planet gear has end faces, the duct being configured to penetrate the planet gear axially between the end faces.

8. A torsional vibration damper according to claim 6, wherein the planet gear has end faces, the duct being configured to penetrate the planet gear axially between the end faces.

9. A torsional vibration damper according to claim 5, wherein the duct is configured as a recess in at least one end face of the planet gear.

10. A torsional vibration damper according to claim 6, wherein the duct is configured as a recess in at least one end face of the planet gear.

11. A torsional vibration damper according to claim 7, and further comprising a valve element arranged in the duct, the valve element including a valve seat and closing means contactable with the valve seat for preventing lubricant from passing in a predetermined direction.

12. A torsional vibration damper according to claim 8, and further comprising a valve element arranged in the duct, the valve element including a valve seat and closing means contactable with the valve seat for preventing lubricant from passing in a predetermined direction.

13. A torsional vibration damper according to claim 11, wherein the duct has a cross-sectional transition, the seat of the valve element being conical and in a region of the cross-sectional transition of the duct.

14. A torsional vibration damper according to claim 12, wherein the duct has a cross-sectional transition, the seat of the valve element being conical and in a region of the cross-sectional transition of the duct.

15. A torsional vibration damper according to claim 5, wherein the duct is configured to extend substantially radially.

16. A torsional vibration damper according to claim 6, wherein the duct is configured to extend substantially radially.

* * * * *